(12) United States Patent
Matsumoto

(10) Patent No.: US 11,226,240 B2
(45) Date of Patent: *Jan. 18, 2022

(54) TEMPERATURE SENSOR AND TEMPERATURE MEASURING DEVICE

(71) Applicant: KYOCERA Corporation, Kyoto (JP)

(72) Inventor: Hiroshi Matsumoto, Kirishima (JP)

(73) Assignee: KYOCERA CORPORATION, Kyoto (JP)

(*) Notice: Subject to any disclaimer, the term of this patent is extended or adjusted under 35 U.S.C. 154(b) by 458 days.

This patent is subject to a terminal disclaimer.

(21) Appl. No.: 16/312,891

(22) PCT Filed: Mar. 23, 2018

(86) PCT No.: PCT/JP2018/011784
§ 371 (c)(1),
(2) Date: Dec. 21, 2018

(87) PCT Pub. No.: WO2018/198620
PCT Pub. Date: Nov. 1, 2018

(65) Prior Publication Data
US 2019/0219453 A1    Jul. 18, 2019

(51) Int. Cl.
*G01K 7/18* (2006.01)
*G01K 1/08* (2021.01)
*H01C 7/00* (2006.01)

(52) U.S. Cl.
CPC ............. *G01K 7/183* (2013.01); *G01K 1/08* (2013.01); *G01K 7/18* (2013.01); *H01C 7/008* (2013.01)

(58) Field of Classification Search
CPC . H01C 7/18; H01C 7/22; H01C 7/032; H01C 7/038; G01K 7/18–21; G01K 7/183
See application file for complete search history.

(56) References Cited

U.S. PATENT DOCUMENTS

| 4,901,051 A | * | 2/1990 | Murata | G01K 7/18 29/612 |
| 5,199,791 A | * | 4/1993 | Kasanami | G01K 7/18 338/25 |

(Continued)

FOREIGN PATENT DOCUMENTS

| EP | 3136067 B1 * | 1/2019 | G01K 7/18 |
| EP | 3450945 A1 | 3/2019 | |

(Continued)

*Primary Examiner* — Kyung S Lee
(74) *Attorney, Agent, or Firm* — Volpe Koenig

(57) ABSTRACT

A temperature sensor includes an insulating substrate made of ceramics and having a first surface and a second surface an electrode including a cathode electrode and an anode electrode, which are disposed on the first surface of the insulating substrate; a resistance wire portion including one or more resistance wires inside the insulating substrate, a cathode end portion of the resistance wire portion being electrically connected to the cathode electrode, and an anode end portion of the resistance wire portion electrically connected to the anode electrode; and one or more metal layers connected to a portion in a path through which current flows between the cathode electrode and the anode electrode, and the portion having a potential identical with or lower than that of the resistance wire portion.

20 Claims, 8 Drawing Sheets

(56) References Cited

U.S. PATENT DOCUMENTS

| | | | |
|---|---|---|---|
| 5,406,246 A * | 4/1995 | Friese | G01K 7/18 338/22 R |
| 6,140,906 A * | 10/2000 | Kaihara | G01K 7/183 29/610.1 |
| 10,247,620 B2 * | 4/2019 | Matsumoto | G01K 7/20 |
| 10,495,521 B2 * | 12/2019 | Matsumoto | G01N 27/403 |
| 2002/0084885 A1 | 7/2002 | Wienand et al. | |
| 2017/0219439 A1 * | 8/2017 | Matsumoto | H05K 1/0306 |
| 2018/0245990 A1 * | 8/2018 | Matsumoto | G01K 1/14 |
| 2019/0101457 A1 * | 4/2019 | Matsumoto | G01K 7/18 |

FOREIGN PATENT DOCUMENTS

| | | |
|---|---|---|
| JP | 11-121214 A | 4/1999 |
| JP | 2002-188966 A | 7/2002 |
| JP | 2003-517574 A | 5/2003 |
| JP | 2016-046429 A | 4/2016 |
| WO | 2017/188326 A1 | 11/2017 |

\* cited by examiner

TEMPERATURE SENSOR AND TEMPERATURE MEASURING DEVICE

TECHNICAL FIELD

The present disclosure relates to a temperature sensor and a temperature measuring device.

BACKGROUND ART

As a temperature sensor used for an exhaust gas sensor or the like, those utilizing a change of electric resistance of a metal material depending on temperature are known. For example, those having a resistance wire, in which a resistance value is changed depending on temperature, on an insulating substrate made of a ceramic sintered body such as an aluminum oxide-based sintered body have been used.

CITATION LIST

Patent Literature

PTL 1: Japanese Unexamined Patent Application Publication No. 11-121214

SUMMARY OF INVENTION

A temperature sensor according to one aspect of the present disclosure includes an insulating substrate made of ceramics and having a first surface and a second surface; a cathode electrode and an anode electrode on the first surface of the insulating substrate; a resistance wire portion including one or more resistance wires inside the insulating substrate, a cathode end portion of the resistance wire portion electrically connected to the cathode electrode, and an anode end portion of the resistance wire portion electrically connected to the anode electrode; and one or more metal layers connected to a portion in a path through which current flows between the cathode electrode and the anode electrode, and the portion having a potential identical with or lower than that of the resistance wire portion.

A temperature measuring device according to another aspect of the present disclosure includes a temperature sensor having the above configuration; and a measuring circuit connected to the electrode of the temperature sensor via the cathode electrode and the anode electrode.

DESCRIPTION OF EMBODIMENTS

Hereinbelow, a temperature sensor and a temperature measuring device of an embodiment will be described with reference to the drawings. The upper and lower distinctions in the following description are for convenience and do not limit the upper and lower sides when the sensor substrate or the like is actually used.

Figure 1:
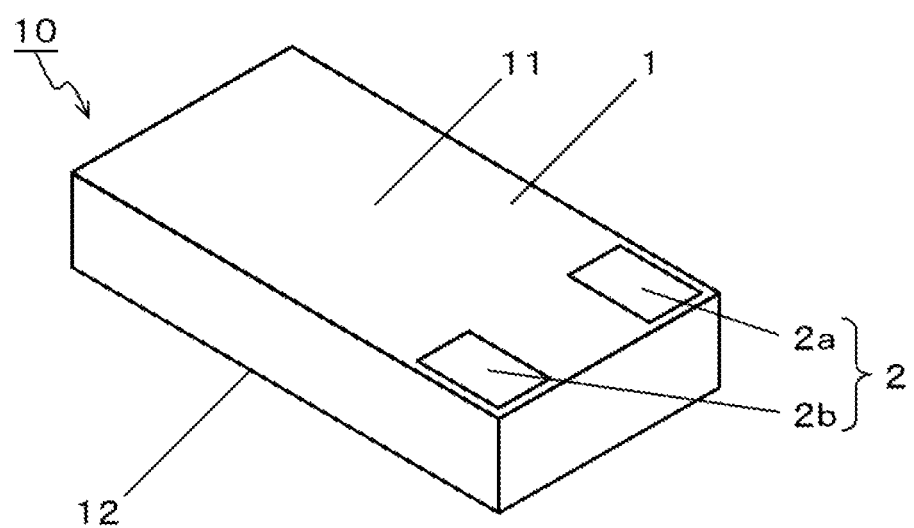
FIG. 1 is a perspective view illustrating an exemplary appearance of a temperature sensor of an embodiment.

FIG. 1 is a perspective view illustrating an exemplary appearance of a temperature sensor of an embodiment. Each of FIGS. 2 and 3 is an example of the exploded perspective view of the temperature sensor illustrated in FIG. 1.

A temperature sensor 10 includes: an insulating substrate 1 made of ceramics and having a first surface 11 and a second surface 12; an electrode 2 including a cathode electrode 2a and an anode electrode 2b, which are disposed on the first surface of the insulating substrate 1 and connected to an external measuring circuit; a resistance wire portion 3 including a resistance wire 3a inside the insulating substrate 1, both end portions of the resistance wire 3a being respectively electrically connected to the cathode electrode 2a and the anode electrode 2b; and a metal layer 4 which is connected to a position having the same potential as the resistance wire portion 3 or a potential lower than the resistance wire portion inside the insulating substrate 1, and is wider than the resistance wire 3a. A cathode end portion of the resistance wire portion 3 electrically connected to the cathode electrode 2a, and an anode end portion of the resistance wire portion 3 electrically connected to the anode electrode 2b; and the metal layer 4 is connected to a portion in a path through which current flows between the cathode electrode 2a and the anode electrode 2b, and the portion having a potential identical with or lower than that of the resistance wire portion 3.

Figure 2:
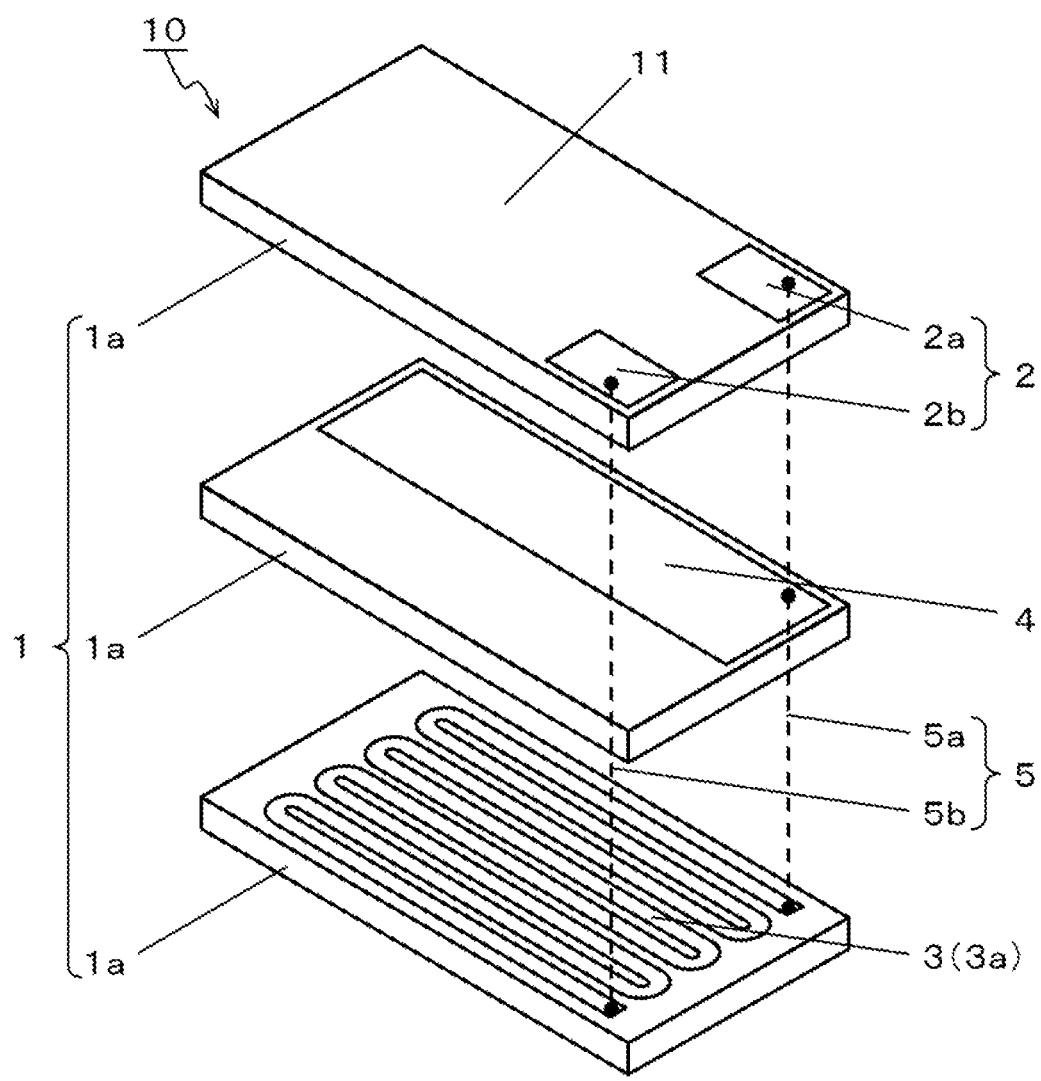
FIG. 2 is an exploded perspective view of the temperature sensor illustrated in FIG. 1.
Figure 3:
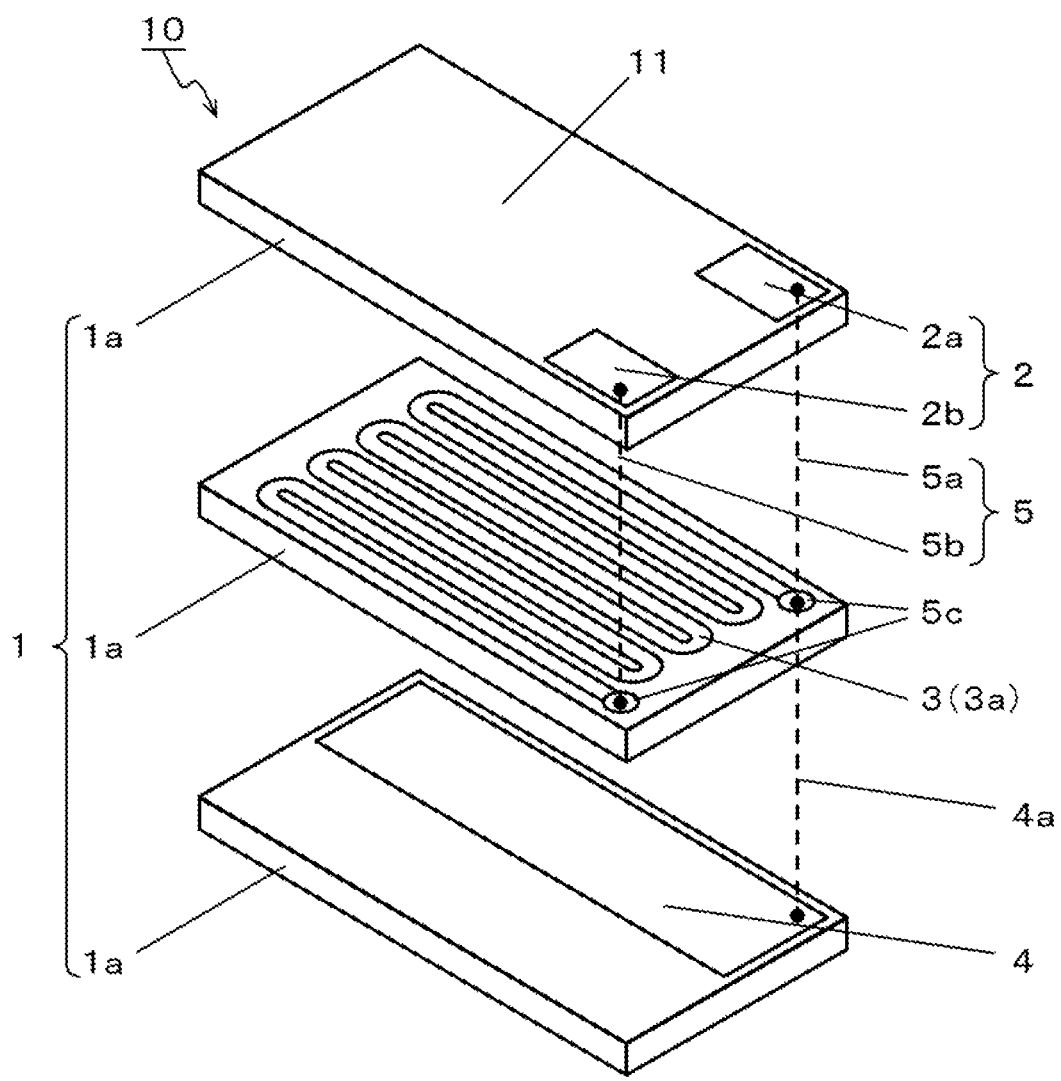
FIG. 3 is an exploded perspective view illustrating another example of the temperature sensor.

In the example illustrated in FIG. 2, the resistance wire 3a is disposed between the insulating layers 1a and 1a on the second surface 12 side (the lower side), and the metal layer 4 is disposed between insulating layers 1a and 1a on the first surface 11 side (the upper side) of the insulating substrate 1 in which the three insulating layers 1a are stacked. In this example, the resistance wire portion 3 is constituted by one resistance wire 3a. One end of the resistance wire 3a, that is, one end of the resistance wire portion 3 is connected to the cathode electrode 2a through a connection conductor 5 (5a), the other end of the resistance wire portion 3 (the resistance wire 3a) is connected to the anode electrode 2b through the connection conductor 5 (5b). The metal layer 4 is connected to the connection conductor 5a between the cathode electrode 2a and the resistance wire portion 3. That is, the metal layer 4 is connected between the anode electrode 2b and the cathode electrode 2a at a position having a lower potential than the resistance wire portion 3.

According to the temperature sensor 10 as described above, since the metal layer 4 is connected to the position having the lower potential than the resistance wire portion 3, the metal ions in the insulating substrate 1 are transferred toward the metal layer 4 having the lower potential, so that the resistance change due to the deterioration of the resistance wire portion 3 by accumulating the metal ions in the resistance wire portion 3 is reduced.

In the temperature sensor in the related art, there is a case where the accuracy of the temperature sensor is deteriorated when energizing is repeated for a long time in a high temperature gas in order to measure, for example, the temperature of the combustion exhaust gas. The reason for this is that calcium, magnesium, and the like contained in a ceramic insulating substrate are ionized, and these metal ions are moved (diffused) to the low potential side of the temperature sensor and are accumulated around the resistance wire on the low potential side, and thereby the resistance wire is deteriorated and the resistance value of the resistance wire is changed. On the other hand, in the temperature sensor 10 having the metal layer 4 as described above, as the metal ions are moved to the metal layer 4, the resistance change in the resistance wire portion 3 due to the accumulation of the metal ions in the resistance wire portion 3, so that deterioration in precision is small.

The cathode electrode 2a and the anode electrode 2b are the electrode 2 for connection to an external measuring circuit. When current is applied from the external measuring circuit, the cathode electrode 2a is connected to a negative pole of a DC power supply of the external circuit, and the anode electrode 2b is connected to the positive pole of the DC power supply of the external circuit. Therefore, in a path through which the current flows between the cathode electrode 2a and the anode electrode 2b, the cathode electrode 2a side has a low potential.

When the current is applied to the electrode 2, the resistance value of the resistance wire portion 3 can be detected, both end portions of which are connected to the electrode 2. Since the resistance value of the resistance wire 3a of the resistance wire portion 3 varies depending on the temperature, the temperature can be known from the resistance value. That is, the resistance wire portion 3 of the temperature sensor 10 functions as a temperature detection unit. Since the resistance wire 3a which is the temperature detection unit is disposed inside the insulating substrate 1 made of ceramics, it is not directly in contact with atmosphere of environment for measuring the temperature, or a gas or liquid measurement object. For this reason, the resistance value is not changed due to corrosion of the resistance wire 3a or the like. The metal layer 4 is wider than the resistance wire 3a and is connected to the connection conductor 5a at one place, and thus does not function as a temperature detection unit.

In the example illustrated in FIG. 3, as compared with the example illustrated in FIG. 2, the arrangement of the resistance wire 3a and the metal layer 4 in the insulating substrate 1 is reversed. The metal layer 4 is disposed between the insulating layers 1a and 1a on the second surface 12 side (the lower side), and the resistance wire 3a is disposed between insulating layers 1a and 1a on the first surface 11 side (the upper side) of the insulating substrate 1. One end of the resistance wire 3a (resistance wire portion 3) is connected to the cathode electrode 2a via a connection pad 5c and a connection conductor 5a, the other end is connected to an anode electrode 2b via the connection pad 5c and the connection conductor 5b. The metal layer 4 is also connected to the connection pad 5c connected to the connection conductor 5a via a through conductor 4a for a metal layer. In this example, the metal layer 4 and the resistance wire portion 3 are connected to the same connection pad 5c, and thus the metal layer 4 is connected to the position having the same potential as the resistance wire portion 3.

Since the metal layer 4 is connected to only one point on the path through which the current flows, the inside of the metal layer 4 has the same potential in the entire area thereof. On the other hand, the potential of the resistance wire portion serving as a path through which the current flows becomes higher as it is closer to the anode electrode 2b in the resistance wire portion 3. Therefore, even though the metal layer 4 and the resistance wire portion 3 are connected to the connection pad 5c having the same potential, the metal layer 4 has substantially the same potential as that of the connection pad 5c in the entire area thereof; whereas, the resistance wire portion 3 has a high potential as it is moved away from the connection pad 5c and approaches the anode electrode 2b. Accordingly, the metal layer 4 has a potential lower than that of the resistance wire portion 3 in almost the entire area thereof. Therefore, as in the example illustrated in FIG. 2, the metal ions are moved toward the metal layer 4 having the lower potential in the insulating substrate 1, and thus the metal ions are difficult to be accumulated in the resistance wire portion 3, and the resistance change in the resistance wire 3a is reduced.

As described above, when the metal layer 4 is connected to the position having the same potential as that of the resistance wire portion 3 (the example illustrated in FIG. 3), or connected to the position having the potential lower than that of the resistance wire portion 3 (the example illustrated in FIG. 2), the metal layer 4 has the lower potential than that of the resistance wire portion 3. As a result, the metal ions are moved toward the metal layer 4 having the lower potential and are difficult to be accumulated in the resistance wire portion 3, so that the resistance change in the resistance wire 3a is reduced.

In the examples illustrated in FIGS. 2 and 3, the metal layer 4 is disposed so as to overlap with a portion on the low potential side of the resistance wire 3a (resistance wire portion 3) in planar perspective view, in other words, a half near the cathode electrode 2a. The metal layer 4 may be disposed so as to overlap with the entire area of the resistance wire 3a in planar perspective view. In other words, the size of the metal layer 4 can be set to be large enough to overlap the entire area of the resistance wire 3a. As described above, the metal ions are moved to a conductor having the lower potential in the insulating substrate 1, and thus are moved to the low potential side in the resistance wire portion 3 (the resistance wire 3a) to be easily accumulated, so that it is effective to dispose the metal layer 4 at a position near this portion. The cost is lower as compared with a case where the size of the metal layer 4 is large so as to overlap the entire area of the resistance wire 3a.

Figure 4:
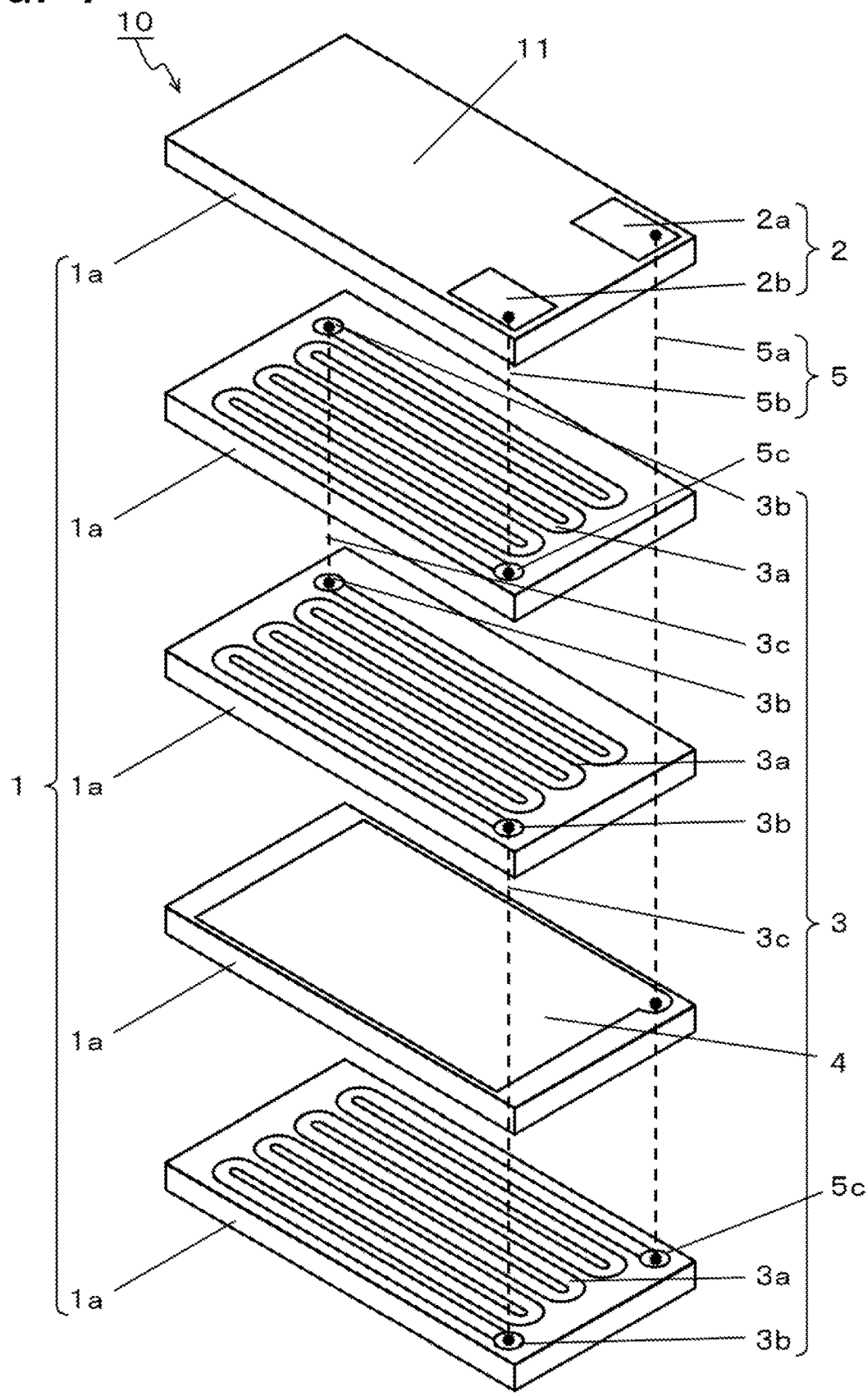
FIG. 4 is an exploded perspective view illustrating another example of the temperature sensor.
Figure 5:
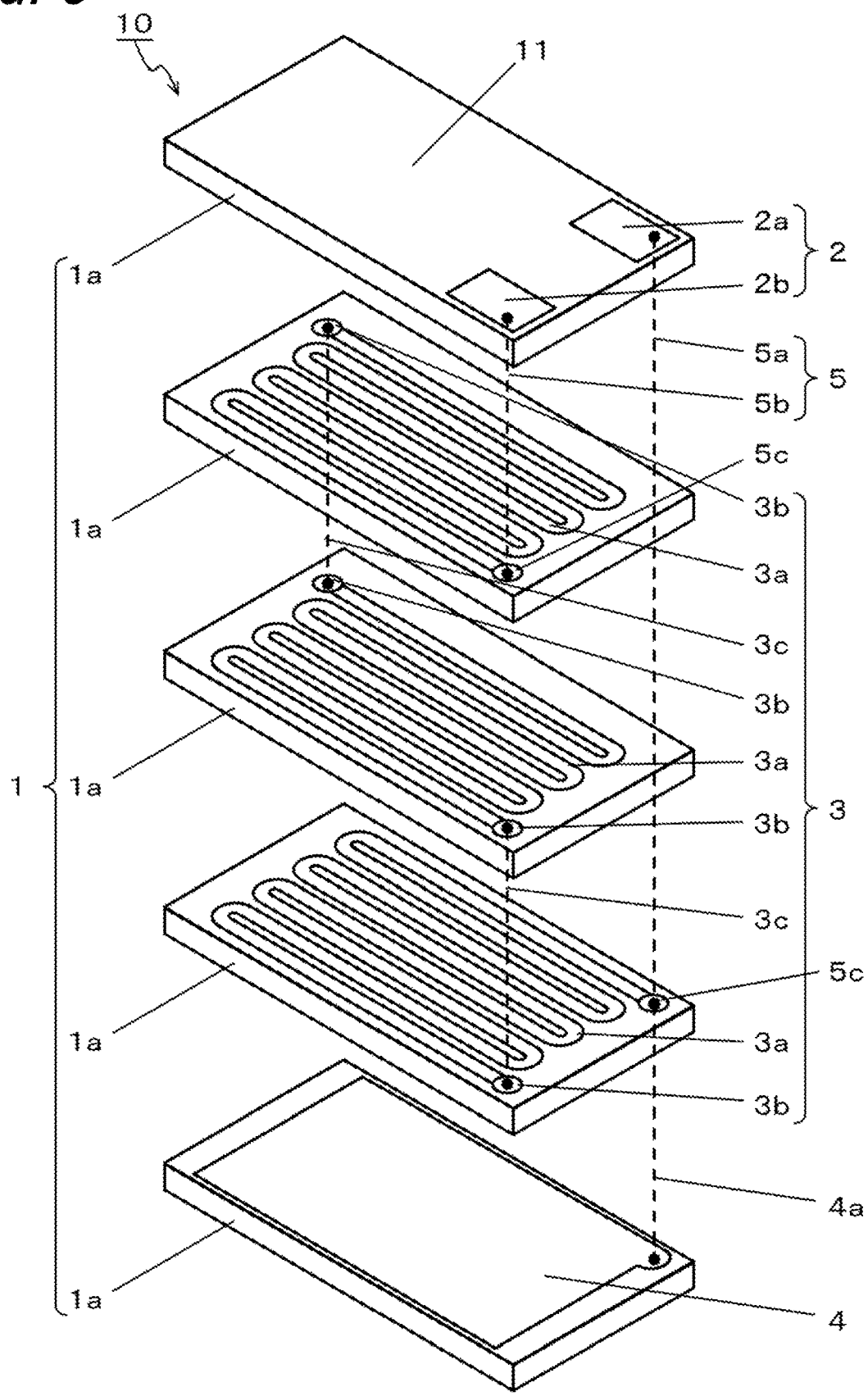
FIG. 5 is an exploded perspective view illustrating another example of the temperature sensor.
Figure 6:
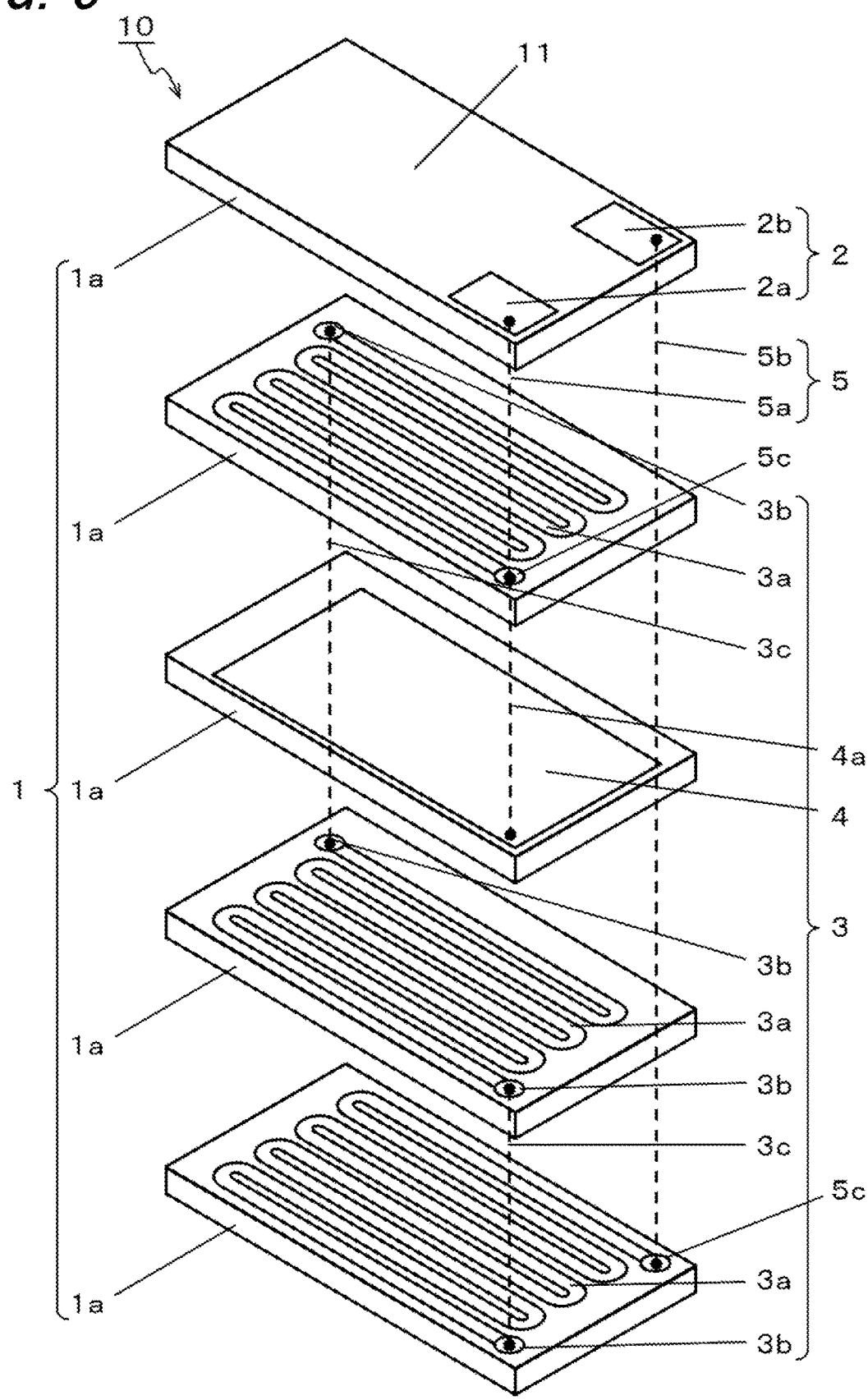
FIG. 6 is an exploded perspective view illustrating another example of the temperature sensor.

FIGS. 4 to 6 are exploded perspective views illustrating other examples of the temperature sensor 10. The examples illustrated in FIGS. 4 to 6 are greatly different from the examples illustrated in FIGS. 2 and 3 in that the number of the insulating layers 1a of the insulating substrate 1 is five which is more than that of the insulating layers 1a illustrated in FIGS. 2 and 3, and the number of the resistance wires 3a disposed in the insulating substrate is more than one (three). In these examples, the resistance wire portion 3 includes three resistance wires 3a disposed between three different insulating layers 1a and 1a, a resistance connection pad 3b which is disposed between the insulating layers 1a and 1a similar to the resistance wires 3a, and to which an end of each resistance wire 3a is connected, and a resistance through conductor 3c connecting the resistance wires 3a positioned vertically (disposed in the thickness direction) in the insulating substrate 1 via the resistance connection pad 3b through the insulating layer 1a between the resistance wires 3a. The three resistance wires 3a are connected in series via the resistance connection pad 3b and the resistance through conductor 3c. The temperature sensor 10 in each example also has a metal layer 4, and the metal layer 4 is connected to a position having a lower potential than that of the resistance wire portion 3.

In this manner, the resistance wire portion 3 may include a plurality of resistance wires 3a disposed in the thickness direction of the insulating substrate 1 and connected to each other in series between the cathode electrode 2a and the anode electrode 2b. As described above, since the resistance wire 3a is the temperature detection unit, the longer the length of the resistance wire 3a is, the larger the temperature detection unit becomes, and thereby the temperature detection sensitivity improves. As the length of one resistance wire 3a in the insulating layer 1a becomes longer, the size of the temperature sensor 10 becomes larger. However, by arranging a plurality of resistance wires 3a in the thickness direction of the insulating substrate 1, the temperature detection unit can be made large while the size in plan view remains small.

In the example illustrated in FIG. 4, among the four layers of the five insulating layers 1a in the insulating substrate 1, the resistance wires 3a are disposed between the layers closest to the first surface 11, the layers second closest to the first surface 11, and the layers furthest away from the first surface 11 of the insulating substrate 1, in other words, the resistance wires 3a are disposed between the layers closest to the second surface 12, the layers third closest to the second surface 12, and the layers furthest away from the second surface 12 of the insulating substrate 1. The end portion of the resistance wire 3a (disposed between the layers) closest to the first surface 11 is connected to the connection pad 5c disposed between the same layers, and the connection pad 5c and the anode electrode 2b are connected via the connection conductor 5b. The end portion of the resistance wire 3a (disposed between the layers) closest to the second surface 12 of the insulating substrate 1 is connected to the connection pad 5c disposed between the same layers, and the connection pad 5c and the cathode electrode 2a are connected via the connection conductor 5a. Therefore, as the resistance wire 3a is close to the second surface 12 of the insulating substrate 1, the resistance wire 3a has the lower potential. In other words, the plurality of resistance wires 3a is connected in series so as to have a low potential as being close to the second surface 12 of the insulating substrate 1 from the first surface 11 of the insulating substrate 1. The metal layer 4 is disposed between the layers second closest to the second surface of the insulating substrate 1. In other words, the metal layer 4 is disposed between the resistance wire 3a closest to the second surface 12 and the resistance wire 3a second closest to the second surface. The metal layer 4 is connected to the connection conductor 5a at such a position in the insulating substrate 1. As a result, the metal layer 4 is connected to a position having a lower potential than those of all the resistance wires 3a. Also in this example, since the metal ions are moved to the metal layer 4 having the lower potential, the metal ions are difficult to be accumulated in the resistance wire 3a having the low potential in the resistance wire portion 3, and thereby the resistance change in the resistance wire portion 3 is reduced. If the resistance wire portion 3 has two resistance wires 3a, if there is the metal layer 4 between the two resistance wires 3a, the metal layer 4 is present between the resistance wire 3a closest to the second surface 12 and the resistance wire 3a second closest to the second surface.

In the example illustrated in FIG. 5, the metal layer 4 is disposed in a different manner as compared with the example illustrated in FIG. 4. In the example illustrated in FIG. 4, the resistance wire 3a (disposed between the layers) closest to the second surface 12 of the insulating substrate 1 and the metal layer 4 are interchanged. As a result, the metal layer 4 is connected to a position having the lower potential than those of the upper two resistance wires 3a and the same potential as that of the lowermost resistance wire 3a. In this example also, it is difficult for the metal ions to be accumulated in the resistance wire 3a having the low potential in the resistance wire portion 3, and the resistance change in the resistance wire 3a is reduced.

In the example illustrated in FIG. 6, the end portion of the resistance wire 3a (disposed between the layers) closest to the first surface 11 of the insulating substrate 1 is connected to the connection pad 5c disposed between the same layers, and the connection pad 5c and the cathode electrode 2a are connected via the connection conductor 5a. Therefore, the arrangement of the three resistance wires 3a differs in the potentials as compared with the examples illustrated in FIGS. 4 and 5. That is, three resistance wires 3a are connected in series so as to have a high potential as being close to the second surface 12 of the insulating substrate 1 from the first surface 11 of the insulating substrate 1. In other words, as the three resistance wires 3a are close to the first surface 11 of the insulating substrate 1, it has the lower potential. The metal layer 4 is disposed between the resistance wire 3a closest to the first surface 11 of the insulating substrate 1 and the resistance wire 3a second closest to the first surface. As a result, the metal layer 4 is connected to a position having the lower potential than those of the lower two resistance wires 3a and the same potential as that of the uppermost resistance wire 3a. In this example also, it is difficult for the metal ions to be accumulated in the resistance wire 3a having the low potential in the resistance wire portion 3, and the resistance change in the resistance wire portion 3 is reduced.

As described above, the metal ions tend to be moved to the low potential side in the resistance wire portion 3 and easily accumulated, and thus if there are a plurality of resistance wires 3a, the metal layer 4 is disposed near the resistance wire 3a having the lower potential. In the example illustrated in FIG. 5, the metal layer 4 is disposed in a position close to the lowermost resistance wire 3a which has the lowest potential. In the examples illustrated in FIG. 4 and FIG. 6, the metal layer 4 is disposed between two resistance wires 3a of the resistance wire 3a which has the lowest potential and the resistance wire 3a which has the second lowest potential. In this way, if the temperature sensor 10 has a plurality of resistance wires 3a, the metal layer 4 can be disposed in a position not only close to the resistance wire 3a having the lowest potential but also close to the resistance wire 3a having the second lowest potential. As compared with the temperature sensor 10 of the example illustrated in FIG. 5, such a temperature sensor 10 of each of the examples illustrated in FIGS. 4 and 6 is more effective in that the accumulation of the metal ions is reduced in the resistance wire 3a which has the second lowest potential.

In comparison between the example illustrated in FIG. 4 and the example illustrated in FIG. 6, the example illustrated in FIG. 4 in which the metal layer 4 is connected to the position having the lower potential than those of all the resistance wires 3a is much more effective in that the accumulation of the metal ions is reduced in the resistance wire 3a which has the second lowest potential. Accordingly, if the resistance wire portion 3 includes the plurality of resistance wires 3a which are disposed in the thickness direction of the insulating substrate 1 and connected to each other in series between the cathode electrode 2a and the anode electrode 2b, the plurality of resistance wires 3a are connected so as to have a low potential as being close to the second surface 12 of the insulating substrate 1 from the first surface 11 of the insulating substrate 1, and the metal layer 4 can be disposed between the resistance wire 3a which is the closest to the second surface 12 and the resistance wire 3a which is the second closest to the second surface 12.

Figure 7:
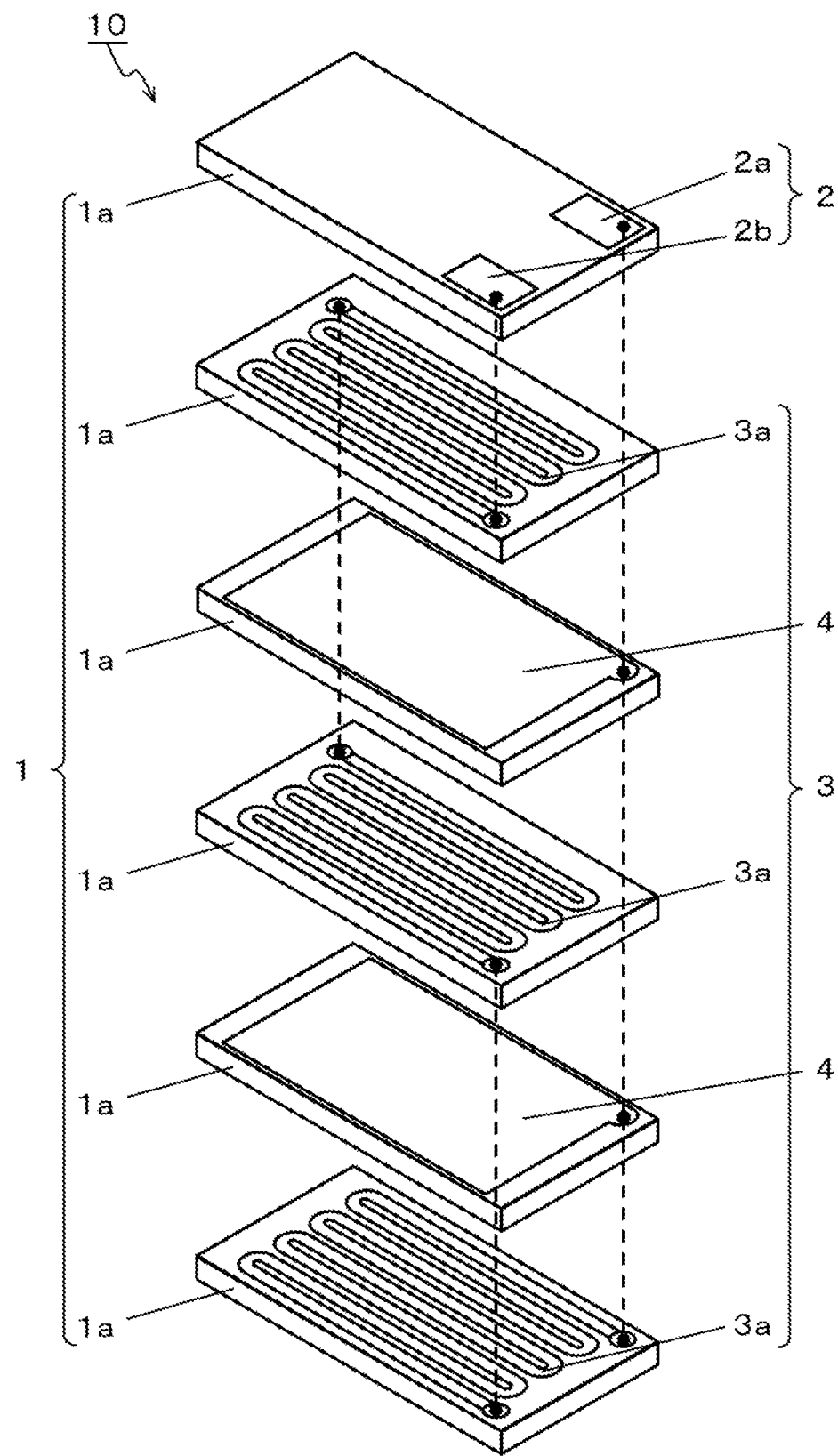
FIG. 7 is an exploded perspective view illustrating another example of the temperature sensor.

FIG. 7 is an exploded perspective view illustrating another example of the temperature sensor 10. As compared with the example illustrated in FIG. 4, the number of the metal layers 4 is increased by one, and the metal layer 4 is disposed not only between the resistance wire 3a which is the closest to the second surface 12 and the resistance wire 3a which is the second closest to the second surface 12, but also between the resistance wire 3a which is the second closest to the second surface 12 and the resistance wire 3a which is the third closest to the second surface 12. In other words, a plurality of the metal layers 4 is disposed in the thickness direction of the insulating substrate 1, and the resistance wire 3a and the metal layer 4 are alternately disposed between the first surface 11 and the second surface 12 of the insulating substrate 1 with the resistance wires 3a set to the both ends. In other words, each of the plurality of metal layers 4 is disposed between all of two adjacent resistance wires 3a. As described above, if the temperature sensor 10 has the plurality of resistance wires 3a, the plurality of metal layers 4 may be arranged in the vicinity of the plurality of corresponding resistance wires 3a. Since each of the plurality of metal layers 4 is connected to the position having the potential lower than or the same potential as that of the resistance wire 3a, and such a metal layer 4 is disposed close to all the resistance wires 3a, and thereby the possibility of accumulating the metal ions in the wire 3a can be further reduced. In FIG. 7, reference numerals of portions (the resistance connection pad and the resistance penetration conductor) other than the resistance wire 3a of the resistance wire portion 3 and the connection conductor (the connection conductor of the cathode electrode, the connection conductor of the anode electrode, and the connection pad) are not illustrated.

In the example illustrated in FIG. 7, the resistance wire portion 3 includes the plurality of resistance wires 3a which are disposed in the thickness direction of the insulating substrate 1 and connected to each other in series between the cathode electrode 2a and the anode electrode 2b. The plurality of resistance wires 3a is connected so as to have a low potential as being close to the second surface 2212 from the first surface 2111. The metal layer 4 is disposed between all of two adjacent resistance wires 3a and 3a. For this reason, all the metal layers 4 are connected to the position having the lower potential than those of all the resistance wires 3a, and thus the possibility of accumulating the metal ions in all the resistance wires 3a can be further reduced. However, if the metal layer 4 is disposed in a position close to the resistance wire 3a on the low potential side, the above effect can be sufficiently obtained, so that the cost can be reduced while the effect of reducing the resistance fluctuation is exerted as described above by disposing only one metal layer 4 between the resistance wire 3a having the lowest potential and the resistance wire 3a having the second lowest potential.

In the examples illustrated in FIGS. 4 to 7, the metal layer 4 overlaps substantially the entire resistance wire portion 3 in planar perspective view. At least, the metal layer overlaps the entire the resistance wire 3a having the low potential in planar perspective view. As described above, the metal layer 4 may be disposed in the vicinity of the portion having the low potential of the resistance wire portion 3. If there is one metal layer 4, the metal layer 4 may overlap a part of the resistance wire 3a as described above, that is, almost a half of the portion having the low potential in the resistance wire 3a; however, if there is a plurality of metal layers 4, the portion having the low potential in the resistance wire portion 3 corresponds to the entire resistance wire 3a disposed on the low potential side.

The plurality of resistance wires 3a has substantially the same outer size, and in the examples illustrated in FIGS. 4 to 7, the resistance wire 3a which is the closest to the second surface 12 of the insulating substrate 1 has the largest outer shape. In addition, in the examples illustrated in FIGS. 4, 5, and 7, in which the resistance wire 3a which is the closest to the second surface 12 has the lowest potential, in other words, the plurality of resistance wires 3a is connected so as to have a low potential as being close to the second surface 12 from the first surface 11, the metal layer 4 larger than the outer shape of the resistance wire 3a closest to the second surface 12 is disposed and overlaps the entire resistance wire 3a.

The cathode electrode 2a and the anode electrode 2b, and the end portions of the resistance wire portion 3 are connected to each other through the connection conductor 5 (5a and 5b), and a sectional area in a cross section perpendicular to the length direction of the connection conductor 5a connected to the cathode electrode 2a is larger than the sectional area in a cross section perpendicular to the length direction of the resistance wire 3a. With such a configuration, the electric resistance of the connection conductor 5a hardly contributes to the entire electric resistance of the temperature sensor 10. That is, only the resistance wire portion 3 can function as a temperature detection unit. Even when the metal ions are moved and accumulated in the connection conductor 5a, only an outer peripheral portion (surface layer portion) of the connection conductor 5a, which is an interface between the connection conductor 5a and ceramics, is deteriorated and deterioration of a central portion is suppressed, and thus the change (rise) in the electric resistance of the connection conductor 5a is small and the influence on the electric resistance of the entire circuit in the temperature sensor 10 can be suppressed.

Figure 8:
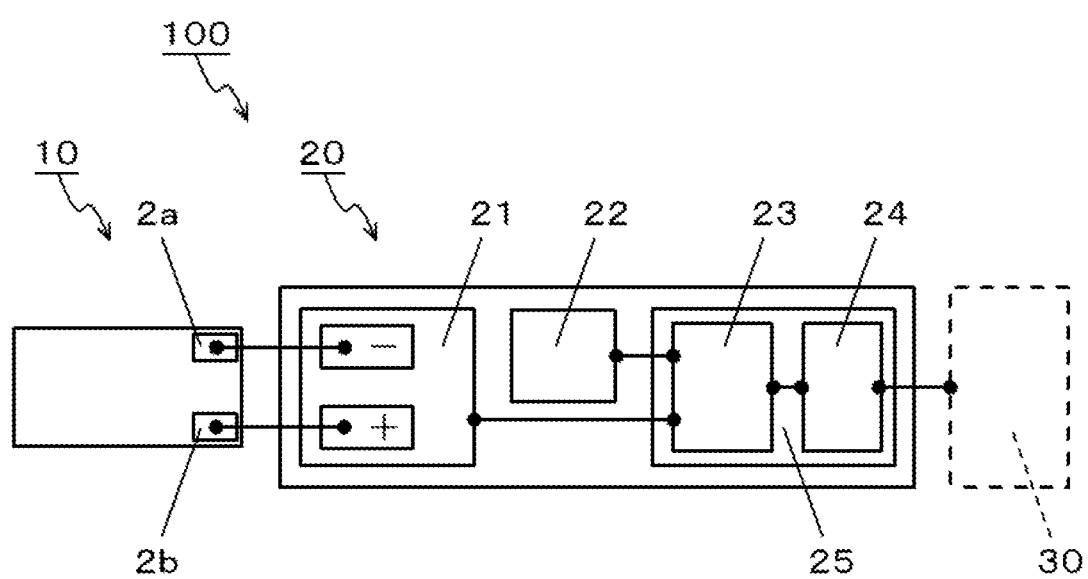
FIG. 8 is a schematic view illustrating an example of a temperature measuring device.

FIG. 8 is a schematic view illustrating an example of a temperature measuring device 100. The temperature measuring device 100 includes the temperature sensor 10 as described above, and a measuring circuit 20 connected to the cathode electrode 2a and the anode electrode 2b of the temperature sensor 10. For this reason, the deterioration of the accuracy of the temperature measurement by repeated use is suppressed.

The measuring circuit 20 includes a direct current (DC) power supply device (power supply circuit) 21 for applying, for example, a measurement current having 1 to 10 mA of a direct current in order to measure an electric resistance value. A negative pole of the DC power supply device 21 is connected to the cathode electrode 2a and a positive pole is connected to the anode electrode 2b. With this, the resistance value can be measured by the measuring circuit 20. The temperature can be detected based on the measured resistance value. In order to detect the temperature, for example, a storage unit 22, a conversion processing unit 23, an output unit 24, and the like as described below may be included. Data (data on a relationship between the resistance value of the temperature sensor 10 and the temperature) of a change in the resistance value of (the resistance wire portion 3 of) the temperature sensor 10 due to the temperature is stored in the storage unit (memory) 22 included in the measuring circuit 20. The measuring circuit 20 includes the conversion processing unit 23 for detecting the resistance value of the resistance wire portion 3 of the temperature sensor 10 and converting the resistance value from the data of the storage unit 22 into temperature data. Then, the temperature data is output from the output unit 24 of the measuring circuit 20 to an external device 30 that uses this temperature data. The conversion processing unit 23, the output unit 24, and the like are integrated into one microcomputer 25, for example.

The insulating substrate 1 is, for example, a flat plate shape such as a quadrilateral plate shape, and is a base portion for disposing the resistance wire portion 3 electrically insulated. The insulating substrate 1 is formed of, for example, a ceramic sintered body such as an aluminum oxide-based sintered body, an aluminum nitride-based sintered body, a mullite sintered body, and zirconia ceramic (a zirconium oxide-based sintered body). The insulating substrate 1 is formed by laminating the plurality of insulating layers 1a made of such a ceramic sintered body.

If each insulating layer 1a is formed of, for example, the aluminum oxide-based sintered body, the insulating substrate can be manufactured by the following method. First, raw material powders such as silicon oxide ($SiO_2$), magnesium oxide (MgO), calcium oxide (CaO), and manganese oxide ($Mn_2O_3$) are added to a powder of aluminum oxide ($Al_2O_3$) as a sintering aid, a binder, a solvent, and a plasticizer are further added in a proper amount, and then a mixture of these is kneaded and formed into slurry. Thereafter, the resultant is formed into a sheet by a well-known method in the related art, such as, a doctor blade method or a calendar roll method so as to obtain a ceramic green sheet, a proper punching process is performed on the ceramic green sheet, and a plurality of ceramic green sheets is stacked as necessary and fired at a high temperature (approximately 1300° C. to 1600° C.) for manufacturing. The plurality of ceramic green sheets serves as the insulating layer 1a. The insulating substrate 1 contains glass having calcium (Ca), magnesium (Mg), or the like.

The resistance wire portion 3 is made of platinum which is a metal material of which the electric resistance is changed depending on temperature, or made of a metal material containing platinum as a main component. In order to detect the change in the electric resistance of the metal material depending on the temperature change, one having a large absolute value of the electric resistance of the resistance wire portion at a reference temperature (for example, 0° C.) may be used.

This is due to the following reason. That is, the change in the electric resistance depending on the temperature change of the resistance wire portion 3 occurs at a constant ratio irrespective of the magnitude (absolute value) of the electric resistance at the reference temperature. In other words, as the value of the electric resistance at the reference temperature is increased, the absolute value of the change in the electric resistance with the temperature change is increased. The greater the absolute value of the change in the electric resistance, the less susceptible the influence of noise (fluctuation of the electric resistance due to factors other than the temperature change). The electric resistance is easily measured as well. Accordingly, a resistance wire portion 3 having a large electric resistance at the reference temperature may be used. For this reason, the metal material such as platinum is linear (that is, a shape which is effective in increasing the absolute value of electric resistance, and in which the metal material is long and has a small sectional area in the cross section perpendicular to the length direction, in a section where the electric resistance is measured).

However, if the electric resistance is changed due to factors other than the temperature change, for example, a factor such as deterioration, an error occurs in the temperature indicated by the temperature sensor, thereby resulting in a decrease in accuracy. Therefore, it is required to reduce the change as much as possible in the electric resistance due to the factors other than the temperature change.

Regarding components other than platinum in the metal material containing platinum as a main component of the resistance wire portion 3, for the purpose of adjusting a temperature coefficient of resistance (TCR) of the resistance wire portion 3, improving heat resistance, and the like, the components (kinds) and the amount of addition are appropriately selected. Examples of a component other than platinum may include, for example, a metal material of a platinum group element such as palladium, rhodium, iridium or the like, and gold or the like. When importance is placed on the linearity of the change in the electric resistance with respect to the temperature change of the resistance wire portion 3, the content of platinum can be made large.

The metal material contains platinum as a main component at a ratio of about 80% by mass or more. The platinum and the other components may form an alloy or may exist as independent crystal grains. The resistance wire portion 3 may contain additives other than metal components such as platinum or a metal material containing platinum as a main component. Examples of the additives include particles of inorganic substances such as aluminum oxide and the like similar to those contained in the insulating substrate 1. The additives are added, for example, for matching firing shrinkage factors between the resistance wire portion 3 and the insulating layer 1a.

The resistance wire portion 3 is made of a meander-shaped resistance wire 3a and the resistance connection pad 3b. The resistance connection pad 3b is formed to be wider than the resistance wire 3a in plan view in consideration of a misalignment when the plurality of insulating layers 1a is stacked. The reason why the resistance wire 3a is formed into a meander shape is to make the wire length as long as possible within a predetermined dimension so as to make the electric resistance large. The resistance wire portion 3 can be formed by applying, for example, a metal paste prepared by kneading a platinum powder together with an organic solvent and a binder to a main surface or the like of the ceramic green sheet corresponding to the insulating layer 1a in a predetermined pattern and simultaneously firing the main surface of the ceramic green sheet.

The resistance wire portions 3 formed in the respective insulating layers 1a are connected in series through the resistance through conductors 3c and the resistance connection pads 3b so as to form an electric circuit, and both end portions of the resistance wire portion 3 are connected to the electrode (the cathode electrode 2a and the anode electrode 2b) through the connection pad 5c and the connection conductor 5 (5a and 5 b). For example, by measuring the electric resistance between the electrodes 2 by the external electric circuit, the electric resistance of the resistance wire portion 3 connected in series can be measured. Since this value is changed depending on the environmental temperature (external temperature), the external temperature can be detected by measuring the electric resistance between the electrodes 2. Note that, the temperature detection unit in the temperature sensor 10 is the resistance wire portion serving as a resistor, and the electrode 2 and the via conductors, such as the connecting conductor 5, having a large sectional area have low electric resistances, and do not have a function of detecting the temperature of the temperature sensor 10. Since the resistance connection pad 3b and the resistance through conductor 3c in the resistance wire portion 3 also have a large sectional area with respect to the resistance wire 3a and have low electric resistances, the resistance wire 3a substantially has a function of detecting the temperature. In other words, preventing deterioration of the resistance wire 3a of the resistance wire portion 3 is one of the important points for suppressing deterioration of the function of the temperature sensor 10.

The temperature measured by the temperature sensor 10 is, for example, the temperature of various kinds of combustion exhaust gas, and there are cases where it is necessary to detect a high temperature of about several hundred degrees Celsius to a thousand degrees Celsius. Since the stability at such a high temperature and the linearity of the electric resistance change depending on the temperature are good, the resistance wire portion 3 is made of platinum or a metal material containing platinum as a main component. For example, the temperature sensor 10 is disposed in a portion (a gas flow path or the like) where the temperature to be measured is present, and is electrically connected to an electric circuit (measuring circuit) (not illustrated) for resistance detection as described above so as to measure the temperature as a temperature measuring device.

Further, when the resistance wire portion 3 is exposed to the surface of the insulating substrate 1, there is a possibility that the electric resistance is unnecessarily changed due to adhesion of a foreign matter or destruction caused by erroneous collision with the external substrate or another component or the like mounted on the external substrate. In order to prevent this, as described above, the resistance wire portion 3 is disposed between the layers of a plurality of insulating layers 1a. In other words, the resistance wire portion 3 is disposed inside the insulating substrate 1 and is not exposed to the outside.

A line width of the resistance wire 3a is appropriately set in accordance with the conditions such as the accuracy of the temperature measurement of the temperature to be detected, the temperature range, the thickness and the length of the resistance wire portion 3, the distance from the outer periphery of the insulating layer 1a to the resistance wire 3a, and the conditions such as productivity and economic efficiency. For example, when the temperature range to be detected is a high temperature range of about 500° C. to 1000° C., the resistance wire 3a is made of platinum (so-called pure platinum having a platinum content of 99.99% by mass or more, or the like), and if the thickness thereof is about 5 μm to 15 μm, the line width of the resistance wire 3a is set to, for example, about 20 μm to 200 μm.

In consideration of such setting of the thickness of the resistance wire 3a and the like, the insulating layer 1a is made of a ceramic sintered body and the resistance wire 3a can be set as a thick film conductor. Such a resistance wire 3a is formed by simultaneous firing with, for example, the insulating substrate 1 (the plurality of insulating layers 1a). If the resistance wire 3a is a thick film conductor, it is easy to make the thickness relatively thick, such as about 10 μm or more as described above. Since such a comparatively thick resistance wire 3a can be formed by simultaneous firing with the insulating substrate 1, it is advantageous in terms of the strength of bonding between the resistance wire 3a and the insulating substrate 1 and the productivity of the temperature sensor 10. A pattern of the resistance wire 3a can be easily set only by adjusting the printed pattern of the metal paste corresponding to the resistance wire 3a. Therefore, it is also advantageous in terms of design freedom, the productivity, and the like.

As described above, the resistance wire 3a is a meander-shaped resistance wire including a plurality of linear portions (without reference numerals) arranged in parallel with each other, and a plurality of folded portions (without reference numerals) connecting the ends of linear portions adjacent to each other among the plurality of linear portions. For example, as in the examples illustrated in FIGS. 1 to 7, when the insulating layer 1a has a rectangular shape, the linear portion and the folded portion of the meander-shaped resistance wires 3a can be arranged in parallel with the outer periphery of the insulating layer 1a. The distance from the outer periphery of the insulating layer 1a to the resistance wire 3a closest to the outer periphery thereof is substantially the same. Therefore, the possibility is reduced that the partial distance from the outer periphery of the insulating layer 1a to the resistance wire portion 3 is excessively short and the platinum of the resistance wire 3a is sublimated to the outside, and the change in the resistance due to this is suppressed.

In the examples of FIGS. 1 to 7, the shape of the insulating substrate 1 is a quadrangular (rectangular) plate shape, and the resistance wire 3a in the meander pattern is disposed such that the linear portion thereof is along the long side of the rectangular insulating layer 1a. The plurality of folded portions is disposed along the short side. With this, the following advantageous effects are obtained when the metal paste to be the resistance wire 3a is applied by a method such as screen printing or the like. That is, in the printing method, bleeding tends to occur in the metal paste at the folded portion (the boundary portion between the folded portion and the linear portion). Therefore, reducing the number of folds reduces bleeding and increases the resistance value of the entire resistance wire 3a.

The metal layer 4 can be formed by the same method using, for example, a metal material (platinum or the like) similar to that of the resistance wire portion 3. The metal layer 4 can be formed by the same method using, for example, a metal material (platinum or the like) similar to that of the resistance wire portion 3. In the temperature sensor 10 of the embodiment, the metal layer 4 is made of platinum and has a wide rectangular pattern. The metal layer 4 may have another shape or may be a bent band, but is connected to the cathode electrode 2a in the through conductor 4a for a metal layer. As illustrated in the drawing, the pattern may not be in a state in which the entire pattern is painted (so-called solid pattern), but may be formed into a mesh shape or the like, and it can be appropriately selected in consideration of economic efficiency and the like.

The electrode 2 is a portion for connecting the resistance wire portion 3 to an external substrate including an external electric circuit. The electrode 2 can be formed by the same method using, for example, a metal material (platinum or the like) similar to the resistance wire portion 3. The electrode 2 in the examples illustrated in FIGS. 1 to 7 is made of platinum and has a rectangular pattern, but may have other shapes. The electrode 2 may be formed of a lead terminal (not illustrated) made of gold or the like. The lead terminal may be connected to the electrode 2 by resistance welding or the like.

Since the electrode 2 may be placed in a high-temperature environment together with the temperature sensor 10 as will be described later, it can be made of a platinum group metal containing platinum, or a metal material such as gold having high oxidation resistance at high temperature.

The resistance through conductor 3c, the through conductor 4a for a metal layer, and the connection conductor 5 (5a and 5 b) (hereinafter, also collectively referred to as a through conductor) is also made of a conductor material (metal material) containing the metal material (platinum or the like) as a main component similar to the resistance wire portion 3. Examples of such a metal material may include platinum and one containing platinum as a main component to which an inorganic filler such as alumina is added. The inorganic filler is for matching the shrinkage factor, shrinkage behavior, and the like of the through conductor and the insulating substrate 1, for example, when those are formed by simultaneous firing.

The through conductor can be formed by filling a through-hole previously disposed in a ceramic green sheet to be the insulating layer 1a with a metal paste of platinum similar to that as in forming the resistance wire portion 3, and simultaneous firing. The through-hole can be disposed on the ceramic green sheet by a machining method such as a mechanical drilling process using a metal pin, a drilling process with a laser beam, or the like. The particles of the inorganic filler as described above may be added to the metal paste.

As described above, for the same reason that the sectional area of the connection conductor 5a connected to the cathode electrode 2a is made larger than the sectional area of the resistance wire 3a, the sectional area in the cross section perpendicular to the length direction of the through conductor 4a for a metal layer connecting the cathode electrode 2a and the metal layer 4 can be made larger than the sectional area in the cross section perpendicular to the length direction of the resistance wire 3a.

In order to cause only the resistance wire 3a to function as the temperature detection unit, the sectional areas of the electrode 2 (2a and 2b), the resistance connection pad 3b, the resistance through conductor 3c, the metal layer 4, the through conductor 4a for a metal layer, the connection conductor 5 (5a and 5b), and the connection pad 5c can be set to be 1.5 times or more the sectional area in the cross section perpendicular to the length direction of the resistance wire 3a. Since the metal layer 4 and the like are wider than the resistance wire 3a, when the thickness is the same, the sectional area becomes larger. Regarding the through conductor 4a for a metal layer and the connection conductor 5 (5a and 5b) which are connected to the position having the lower potential and are highly likely to be deteriorated due to accumulation of the metal ions, the sectional area can be 5 times or more the sectional area of the resistance wire 3a, and may be 10 times or more.

Note that, the temperature sensor 10 of the present invention is not limited to the example of the above embodiment, and various modifications are possible as long as they are within the scope of the gist of the present invention. For example, the resistance wire 3a may be disposed between four or more layers. The resistance wire 3a of the temperature sensor 10 is not limited to a meander-shaped conductor and may have a pattern of another shape.

REFERENCE SIGNS LIST

1 INSULATING SUBSTRATE
11 FIRST SURFACE
12 SECOND SURFACE
1a INSULATING LAYER
2 ELECTRODE
2a CATHODE ELECTRODE
2b ANODE ELECTRODE
3 RESISTANCE WIRE PORTION
3a RESISTANCE WIRE
3b RESISTANCE CONNECTION PAD
3c RESISTANCE THROUGH CONDUCTOR
4 METAL LAYER
4a THROUGH CONDUCTOR FOR METAL LAYER
5 CONNECTION CONDUCTOR
5a CONNECTION CONDUCTOR OF CATHODE ELECTRODE
5b CONNECTION CONDUCTOR OF ANODE ELECTRODE
5c CONNECTION PAD
10 TEMPERATURE SENSOR
20 MEASURING CIRCUIT
100 TEMPERATURE MEASURING DEVICE

The invention claimed is:

1. A temperature sensor comprising:
an insulating substrate made of ceramics and comprising a first surface and a second surface;
an electrode comprising a cathode electrode and an anode electrode on the first surface of the insulating substrate;
a resistance wire portion comprising one or more resistance wires and one or more meander-shaped resistance wires, each of which includes at least three linear portions, inside the insulating substrate, a cathode end portion of the resistance wire portion electrically connected to the cathode electrode, and an anode end portion of the resistance wire portion electrically connected to the anode electrode; and
one or more metal layers connected to a portion in a path through which current flows between the cathode electrode and the anode electrode, and the portion having a potential identical with that of the resistance wire portion or a potential lower than that of the resistance wire portion
the one or more metal layers covering a region including the at least three linear portions of each of the one or more meander-shaped resistance wires in a planar perspective view.

2. The temperature sensor according to claim 1, wherein the one or more resistance wires comprises two or more resistance wires, and the two or more resistance wires disposed in a thickness direction of the insulating substrate are connected in series between the cathode electrode and the anode electrode,
the one or more metal layers are disposed in the thickness direction of the insulating substrate, and
each of the one or more metal layers is disposed between corresponding two of the two or more resistance wires adjacent to each other.

3. The temperature sensor according to any one of claim 2, wherein the one or more metal layers entirely overlap the resistance wire portion in a planar perspective view.

4. The temperature sensor according to claim 3 comprising
a connection conductor comprising an anode connection conductor electrically connecting the anode electrode to the anode end portion of the resistance wire portion, and a cathode connection conductor electrically connecting the cathode electrode to the cathode end portion, and wherein
in a cross section perpendicular to a length direction, a sectional area of the connection conductor connected to the cathode electrode is larger than a sectional area of the one or more resistance wires.

5. The temperature sensor according to claim 2, wherein the one or more metal layers partially overlap the resistance wire portion in a planar perspective view.

6. The temperature sensor according to claim 5 comprising
a connection conductor comprising an anode connection conductor electrically connecting the anode electrode to the anode end portion of the resistance wire portion, and a cathode connection conductor electrically connecting the cathode electrode to the cathode end portion, and wherein
in a cross section perpendicular to a length direction, a sectional area of the connection conductor connected to the cathode electrode is larger than a sectional area of the one or more resistance wires.

7. The temperature sensor according to claim 2 comprising
   a connection conductor comprising an anode connection conductor electrically connecting the anode electrode to the anode end portion of the resistance wire portion, and a cathode connection conductor electrically connecting the cathode electrode to the cathode end portion, and wherein
   in a cross section perpendicular to a length direction, a sectional area of the connection conductor connected to the cathode electrode is larger than a sectional area of the one or more resistance wires.

8. A temperature measuring device comprising:
the temperature sensor according to claim 2; and
a measuring circuit connected to the electrode of the temperature sensor via the cathode electrode and the anode electrode.

9. The temperature sensor according to claim 1, wherein the one or more metal layers entirely overlap the resistance wire portion in a planar perspective view.

10. The temperature sensor according to claim 1 comprising
   a connection conductor comprising an anode connection conductor electrically connecting the anode electrode to the anode end portion of the resistance wire portion, and a cathode connection conductor electrically connecting the cathode electrode to the cathode end portion, and wherein
   in a cross section perpendicular to a length direction, a sectional area of the connection conductor connected to the cathode electrode is larger than a sectional area of the one or more resistance wires.

11. A temperature measuring device comprising:
the temperature sensor according to claim 1; and
a measuring circuit connected to the electrode of the temperature sensor via the cathode electrode and the anode electrode.

12. The temperature sensor according to claim 1, wherein the one or more metal layers partially overlap the resistance wire portion in a planar perspective view.

13. A temperature sensor comprising:
an insulating substrate made of ceramics and comprising a first surface and a second surface;
an electrode comprising a cathode electrode and an anode electrode on the first surface of the insulating substrate;
a resistance wire portion comprising one or more resistance wires inside the insulating substrate, a cathode end portions of the resistance wire portion electrically connected to the cathode electrode, and an anode end portion of the resistance wire portion electrically connected to the anode electrode; and
one or more metal layers connected to a portion in a path through which current flows between the cathode electrode and the anode electrode, and the portion having a potential identical with that of the resistance wire portion or a potential lower than that of the resistance wire portion,
wherein
the one or more resistance wires comprise at least three resistance wires, and the at least three resistance wires disposed in a thickness direction of the insulating substrate are connected in series between the cathode electrode and the anode electrode,
the at least three resistance wires comprise a first resistance wire which is the closest to the second surface, a second resistance wire which is the second closest to the second surface and a third resistance wire which is the closest to the first surface,
the first resistance wire has potential, the potential lower than that of the third resistance wire, and
the metal layer is disposed between the first resistance wire and the second resistance wire.

14. The temperature sensor according to any one of claim 13, wherein the one or more metal layers entirely overlap the resistance wire portion in a planar perspective view.

15. The temperature sensor according to claim 14 comprising
   a connection conductor comprising an anode connection conductor electrically connecting the anode electrode to the anode end portion of the resistance wire portion, and a cathode connection conductor electrically connecting the cathode electrode to the cathode end portion, and wherein
   in a cross section perpendicular to a length direction, a sectional area of the connection conductor connected to the cathode electrode is larger than a sectional area of the one or more resistance wires.

16. The temperature sensor according to claim 13, wherein
the one or more metal layers partially overlap the resistance wire portion in a planar perspective view.

17. The temperature sensor according to claim 16 comprising
   a connection conductor comprising an anode connection conductor electrically connecting the anode electrode to the anode end portion of the resistance wire portion, and a cathode connection conductor electrically connecting the cathode electrode to the cathode end portion, and wherein
   in a cross section perpendicular to a length direction, a sectional area of the connection conductor connected to the cathode electrode is larger than a sectional area of the one or more resistance wires.

18. The temperature sensor according to claim 13 comprising
   a connection conductor comprising an anode connection conductor electrically connecting the anode electrode to the anode end portion of the resistance wire portion, and a cathode connection conductor electrically connecting the cathode electrode to the cathode end portion, and wherein
   in a cross section perpendicular to a length direction, a sectional area of the connection conductor connected to the cathode electrode is larger than a sectional area of the one or more resistance wires.

19. A temperature measuring device comprising:
the temperature sensor according to claim 13; and
a measuring circuit connected to the electrode of the temperature sensor via the cathode electrode and the anode electrode.

20. A temperature sensor comprising:
an insulating substrate made of ceramics and comprising a first surface and a second surface;
an electrode comprising a cathode electrode and an anode electrode on the first surface of the insulating substrate;
a resistance wire portion comprising one or more resistance wires inside the insulating substrate, a cathode end portion of the resistance wire portion electrically connected to the cathode electrode, and an anode end portion of the resistance wire portion electrically connected to the anode electrode; and
one or more metal layers connected to a portion in a path through which current flows between the cathode electrode and the anode electrode, and the portion having a potential identical with that of the resistance wire portion or a potential lower than that of the resistance wire portion, wherein the one or more resistance wires comprise at least three resistance wires, and the at least three resistance wires disposed in a thickness direction of the insulating substrate are connected in series between the cathode electrode and the anode electrode, the at least three resistance wires comprise a first resistance wire which is the closest to the first surface, a second resistance wire which is the second closest to the first surface and a third resistance wire which is the closest to the second surface, the first resistance wire has potential, the potential lower than that of the third resistance wire, and the metal layer is disposed between the first resistance wire and the second resistance wire.

\* \* \* \* \*